United States Patent [19]

Dunworth

[11] 4,035,442

[45] July 12, 1977

[54] POLYESTER FILAMENTS FLAME RETARDED WITH END-CAPPED POLY(M-PHENYLENE CYCLOHEXYLPHOSPHONATE)

[75] Inventor: William P. Dunworth, Wilmington, Del.

[73] Assignee: E. I. Du Pont de Nemours and Company, Wilmington, Del.

[21] Appl. No.: 688,478

[22] Filed: May 20, 1976

[51] Int. Cl.$^2$ .................... C08L 67/00; D01F 1/02
[52] U.S. Cl. ......................... 260/860; 260/45.7 P; 260/47 P; 260/930; 264/211
[58] Field of Search ............ 260/45.7 P, 47 P, 930, 260/860; 264/211

[56] References Cited

U.S. PATENT DOCUMENTS

| 2,435,252 | 2/1948 | Toy | 260/17 |
|---|---|---|---|
| 2,682,522 | 6/1954 | Coover et al. | 260/47 P |
| 2,743,258 | 4/1956 | Coover | 260/49 |
| 3,719,727 | 3/1973 | Masai et al. | 260/860 |
| 3,829,405 | 8/1974 | Cohen et al. | 260/45.95 D |

Primary Examiner—Lewis T. Jacobs

[57] ABSTRACT

Polyester filaments having improved flame retardant properties are prepared by a process in which a poly(m-phenylene cyclohexylphosphonate) compound is melted, is mixed with molten polyester, and the melt blend is forwarded to a spinning pack and is melt-spun into filaments. The compound is end-capped with p-phenylphenol or p-bromophenol to avoid reaction with the molten polyester.

4 Claims, No Drawings

POLYESTER FILAMENTS FLAME RETARDED WITH END-CAPPED POLY(M-PHENYLENE CYCLOHEXYLPHOSPHONATE)

BACKGROUND OF THE INVENTION

This invention relates to flame-retardant polyester textile filaments and fibers, and is more particularly concerned with melt-blending ethylene terephthalate polymer with a flame-retardant agent and extruding the melt to form filaments.

Phenylphosphonic dichloride can be reacted with resorcinol to produce a polyphosphonate (herein designated PRP) which is useful as a flame-retardant additive in plastics. However, when used as an additive in polyethylene terephthalate, PRP has been found to cause photoyellowing in polyester fabrics which are exposed to ultraviolet light. Under similar conditions, fabrics made of commercial polyethylene terephthalate filaments (no PRP additive) have excellent whiteness. A polyphosphonate prepared by reacting phenylphosphonic dichloride with 4,4'-dihydroxydiphenyl sulfone, instead of resorcinol, causes less discoloration but is too expensive.

Poly(phosphonate-phosphate) copolymers can be prepared by reacting phenylphosphonic dichloride and phenyldichlorophosphate with resorcinol to produce poly[(m-phenylene phenylphosphonate)$_q$(m-phenylene phenylphosphate)$_r$], wherein $q$ and $r$ are integers. The phosphate component makes the flame-retardant additive less expensive but does not overcome the discoloration problem, and cross-linking reactions are difficult to avoid. The presence of cross-linked polymer in the flame-retardant polyester composition can increase the viscosity to such an extent that satisfactory melt-spinning is impracticable.

Diphenyl methylphosphonate can be reacted with resorcinol to produce a poly(m-phenylene methylphosphonate) having phenyl methylphosphonate end groups (herein designated PRM/P). When it is used as a flame-retarding agent in polyethylene terephthalate, heating at 283° C. for 30 minutes under nitrogen causes a drastic reduction in the polymer relative viscosity to less than half the original relative viscosity. Compositions of this type have not been considered suitable for use in producing commercial textile filaments.

SUMMARY OF THE INVENTION

The present invention avoids the above-mentioned difficulties by an improvement in the process for producing polyester textile filaments by pumping molten ethylene terephthalate polymer to a spinning pack and extruding the molten polymer to form filaments. The improvement of the present invention for preparing flame retardant filaments comprises melting and mixing with the molten polymer a polyphosphonate compound represented by the formula,

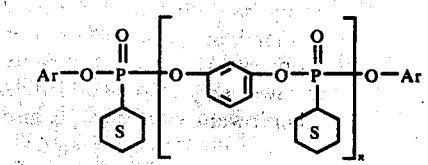

wherein Ar is

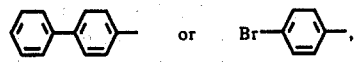

represents cyclohexyl, and $n$ is an integer between 1 and 20, forwarding the resulting melt blend to the spinning pack and extruding the melt blend into filaments. An amount of polyphosphonate compound is added which provides 0.1 to 2 percent phosphorus by weight in the filaments.

Preferably the filaments contain 0.3 to 1.0 percent phosphorus by weight. Preferably Ar in the above formula is a p-diphenyl group and $n$ is an integer from 5 to 15.

The invention provides flame retardant polyester filaments containing about 1 to 16 percent (preferably 3 to 9 percent) by weight of a polyphosphonate compound represented by the above formula.

DETAILED DESCRIPTION

The process of this invention for imparting improved flame retarding properties to polyester filaments is relatively simple and inexpensive. The end-capped poly(m-phenylene cyclohexylphosphonate) compound is readily mixed with the molten polyester to obtain a melt blend which spins into filaments without difficulty. The filaments have adequate flame retardancy, and other properties are not significantly affected by addition of the compound. In fabrics containing the filaments, the compound is durable to conventional scouring, atmospheric and pressure dyeing, home laundering and commercial dry cleaning. As illustrated subsequently in Example II, there is considerably less photoyellowing than when using the apparently similar end-capped poly(m-phenylene phenylphosphonate) compound.

As illustrated subsequently, poly(m-phenylene cyclohexylphosphonate) is readily prepared by heating resorcinol with cyclohexylphosphonic dichloride in the presence of a condensation catalyst such as magnesium sulfate. The poly(m-phenylene cyclohexylphosphonate) is then end-capped by adding a suitable amount of p-phenylphenol or p-bromophenol to the reaction mixture. It is essential that the compound be end-capped at each end of the molecule with a firmly attached, monovalent, non-reactive group. Satisfactory spinning cannot be accomplished without end-caps because the pack pressure rises continuously during spinning. End-capping with resorcinol by using an excess in the reaction with cyclohexylphosphonic dichloride is unsuitable because the spinning pack pressure rises so rapidly that the process quickly becomes inoperable.

The polyphosphonate compound is readily mixed with the polyester to form a melt-blend in which the compound is dissolved in the polyester. Preferably the compound is melted and injected into a stream of molten polyester. Mixing can be accomplished with a conventional 4-stage helical mixer, as indicated in Example I, but adequate mixing can also be accomplished by passage through pumping means used to forward molten polyester to the spinning pack.

The amount of polyphosphonate compound added should be from about 1 to about 16 percent, preferably from about 3 to about 9 percent, by weight, based on the weight of the fiber. If less than about 1 percent is used, the phosphorus content of the composition will be too low to provide a discernible improvement in flame retardancy and more than about 16 percent has not been found necessary to achieve the desired results. Phosphorus contents of from 0.3 to 1 percent, by weight, based on the weight of the filaments, are generally required for production of fabrics having an effective level of flame retardancy for uses such as sleepwear. While lesser amounts may be used to meet less stringent requirements, greater amounts do not lead to benefits proportional to the increased cost.

The melt-blend of the polyphosphonate and the polyester is spun into filaments and drawn using conventional techniques. The filaments may be used as continuous-filament yarns or crimped and cut to staple fibers. If desired, the filaments of this invention may be combined with other filaments to provide mixed-filament yarns. Polyester yarns containing the filaments of this invention are especially useful for production of false-twist textured yarns since physical properties of the polyester are not altered significantly by the poly(m-phenylene cyclohexylphosphonate).

The polyesters used in this invention usually will have a relative viscosity of 10 to 50, preferably 15 to 30.

In the following tests, measurements, preparative procedures, and examples all percentages are by weight based on total weight unless indicated otherwise.

TESTS AND MEASUREMENTS

Relative Viscosity of Polyester

The relative viscosity is determined by measuring the ratio of the viscosity of a solution containing 4.75 percent by weight of the polymer, in hexafluoroisopropanol containing 100 parts per million, by volume, of concentrated sulfuric acid, to the viscosity of the hexafluoroisopropanol sulfuric acid solvent measured in the same units at $25° \pm 0.05°$ C.

Phosphorus Analysis

The phosphorus content of the polyphosphonates and the polyphosphonate-containing polyesters is determined colorimetrically by Heteropoly Blue Method as described in "Colorimetric Determination of Nonmetals" by D. F. Boltz, Ed., on pp. 32–36 (1958).

Fabric Photoyellowing

The photoyellowing of fabrics is determined by exposing them to a xenon arc lamp in an Atlas Weatherometer Model 60 WRC equipped with CS-5 water recirculating unit and refrigeration unit. The xenon arc lamp is equipped with U.V. transmitting filter Cat. No. M-2618X, Atlas Electric Devices Co., Chicago 13, Illinois. Fabric specimens 10–12 inches × 4 inches (25.4 = 30.5 × 10.2 cm) are affixed to the exposure panels for definite time intervals (AATCC Test Method 16E-1974).

The yellowness of the exposed fabrics is determined with the use of a Hunterlab D40 Reflectometer. Fabrics of 6 to 8 layers in thickness are mounted under the clamps. The first reading taken is that of the blue reflectance with fluorescence included $B_i$. Then the green reflectance reading is taken with fluorescence excluded $G_e$. The $b$ value, which is a measure of yellowness, is calculated from the formula $$b = \frac{7(G_e - B_i)}{\sqrt{G_e}}$$

The photoyellowing data are reported as $\Delta b$ values, where $\Delta b$ value is the difference in the $b$ values of the exposed vs. unexposed sample. The higher the $\Delta b$ values, the greater the amount of yellow produced in the sample by light.

Flammability Test

The fabric samples used for measuring flame retardance are 8.9 × 25.4 cm (3.5 × 10 inches) prepared from knit fabric which is merrow seamed with a polyester thread. The seamed fabrics are scoured 30 minutes at the boil in a bath using a bath-to-fabric ratio of about 50 to 1. the bath contains 0.5 percent surfactant and 0.25 percent of tetrasodium pyrophosphate. The fabrics are rinsed in hot water for 5 minutes and then in distilled water for 5 minutes. They are air dried overnight. The scoured fabrics are conditioned for 30 minutes at 105° C in an oven and cooled in a desiccator for 30 minutes prior to testing. Their flame resistance is determined in a steel cabinet with inside dimensions of 30.5 cm (12 inches) wide, 30.5 cm (12 inches) deep, and 78.7 cm (31 inches) high. The front of the cabinet is a close fitting door with a glass insert to permit observation. The cabinet floor is covered with asbestos paper. The cabinet is equipped with a gas burner having a tube 1.1 cm (0.43 inches) inside diameter and a valve for adjusting the height of the flame to a 3.8 cm (1½ inches). The barrel of the burner is positioned at an angle of 25° from the vertical with the highest point 17.5 cm (6.9 inches) above the floor of the cabinet. The burner is supplied with gas which is at least 97 percent pure methane and which is under a pressure of $129 \pm 13$ mm Hg ($2.5 \pm 0.25$ psig). The fabric sample is suspended in a vertical position in a specimen holder with the bottom of the specimen holder 1.7 cm (¾ inch) above the highest point of the barrel of the gas burner. The specimen holder consists of two U-shaped 0.32 cm (⅛ inch) thick steel plates, 41.9 cm (16.5 inches) long and 8.9 cm (3.5 inches) wide, with aligning pins. The openings in the plates are 35.6 cm (14 inches) long and 5.1 cm (2 inches) wide. The fabric sample is mounted between the plates, which are held together with side clamps.

The mounted sample of fabric is suspended in the cabinet and is tested by impinging the burner flame on the botton edge of the fabric for $3.0 \pm 0.2$ seconds. The time from removal of the burner flame to the final extinction of molten material, or other fragments flaming on the floor of the cabinet, is measured and reported as "residual flame time". The time from removal of the burner flame to final extinction of the fabric is measured and reported as "fabric burn time". When afterglow in the fabric has ceased, the sample is removed from the holder and placed on a clean flat surface. The sample is folded lengthwise along a line through the highest peak of the charred or melted area, creased firmly by hand, and then unfolded. A hook with the correct load, as specified below, is inserted in the sample on one side of the charred area 6.4 mm (¼ inch) from the lower edge. The sample is then torn by grasping the other lower corner of the fabric and gently raising the sample and weight clear of the supporting surface. The distance from the end of the tear to the edge of the fabric exposed to the flame is measured and reported as "char length". After testing each sample the cabinet is vented to remove smoke and/or toxic gases.

| Fabric Weight | Load |
| --- | --- |
| Less than 101 g/square meter | 54.4 g |
| 101–207 | 113.4 |
| 207–338 | 226.8 |
| Greater than 338 | 340.2 |

PREPARATION OF POLYPHOSPHONATES

1. Poly(m-phenylene cyclohexylphosphonate) End-capped With Phenol (PRC/P)

A mixture of 971 grams of resorcinol, 1863 grams of cyclohexylphosphonic dichloride, 82.94 grams of phenol and, as a catalyst, 8.8 grams of magnesium sulfate is heated at 150° C for 2 hours under nitrogen and then at 180° C for 18 hours under nitrogen. At this stage, 85.15 grams of phenol is added and the reaction mixture is heated at 180° C for an additional 2.5 hours under nitrogen. It is then heated at 200° C for 3.5 hours under a reduced pressure of less than 3 torr. The polymer is poured into trays blanketed with nitrogen. The PRC/P has a molecular weight of 2156 as determined by vapor phase osmometry in chloroform, a calculated degree of polymerization, n, of 7.7 and a phosphorus content of 12.2 percent.

2. Poly(m-phenylene cyclohexylphosphonate) End-capped With p-Phenylphenol (PRC/PP)

A mixture of 971 grams of resorcinol, 1863 grams of cyclohexylphosphonic dichloride, 150.0 grams of p-phenylphenol, and 9.0 grams of magnesium sulfate is heated at 150° C for 2 hours under nitrogen and then at 180° C for 18 hours under nitrogen. At this stage, 154.0 grams of p-phenylphenol (PP) is added and the mixture is heated for an additional 2 hours at 180° C under nitrogen. It is then heated at 200° C for 4 hours under a reduced pressure of less than 3 torr. The polymer is drained into stainless steel trays blanketed with nitrogen. The PRC/PP has a molecular weight of 1497 as determined by vapor phase osmometry in chloroform, a calculated degree of polymerization, n, of 4.3 and a phosphorus content of 11.2 percent.

3. Poly(m-phenylene cyclohexylphosphonate) End-capped With p-Bromophenol (PRC/BP)

A mixture of 971 grams of resorcinol, 1863 grams of cyclohexylphosphonic dichloride, 152.5 grams of p-bromophenol, 8.8 grams of magnesium sulfate is heated at 150° C for 2 hours under nitrogen and then at 180° C for 18 hours under nitrogen. At this stage, 156.5 grams of p-bromophenol is added. The reaction mixture is heated at 180° C for an additional 2 hours and then heated at 200° C for 4 hours under a reduced pressure of less than 3 torr. The polymer is poured into stainless steel trays blanketed with nitrogen. The PRC/BP has a molecular weight of 1547 as determined by vapor phase osmometry in chloroform, a calculated degree of polymerization, n, of 4.5 and a phosphorus content of 11.3 percent.

4. Poly(m-phenylene phenylphosphonate) End-capped With p-Phenylphenol (PRP/PP)

A mixture of 970 grams of resorcinol, 1807.4 grams of phenylphosphonic dichloride, 150.0 grams of p-phenylphenol, and 8.8 grams of magnesium sulfate is heated at 150° C for 2 hours and then at 180° C for 18 hours under nitrogen. At this stage, 153.8 grams of p-phenylphenol is added and the reaction mixture is heated at 180° C for an additional 2 hours under nitrogen and then at 200°–210° C for 3.5 hours at a reduced pressure of less than 3 torr. The polymer is drained into stainless steel trays blanketed with nitrogen. The PRP/PP has a molecular weight of 1796 as determined by vapor phase osmometry in chloroform, a calculated degree of polymerization, n, of 5.7 and a phosphorus content of 12.1 percent.

5. Poly(m-phenylene methylphosphonate) End-capped With Phenol (PRM/P)

A mixture of 54.6 grams of diphenyl methylphosphonate, 22.0 grams of resorcinol, and 0.2 gram of magnesium chloride is heated at 190° C for 16 hours under nitrogen and then under a reduced pressure of less than 3 torr for 2 hours. The PRM/P has a molecular weight of 2077 as determined by vapor phase osmometry in chloroform, a degree of polymerization, n, of 10.8 and a phosphorus content of 17.6%.

EXAMPLE I

This example illustrates a continuous process of melt-blending polyester with various polyphosphonates, prepared as above, and melt-spinning the blend to form the filaments of Table I.

A molten stream of polyphosphonate having a temperature of about 180° C is injected continuously into a molten stream of poly(ethylene terephthalate) having a temperature of about 285° C and a relative viscosity of 24, and containing 0.3% titanium dioxide. Injection is at such a rate as to provide the phosphorus content indicated in Table I. The phosphonate and the polyester are mixed by a four-stage helical mixer and the melt blend is forwarded to a spinning pack and spun into a yarn which is then drawn 3.8X and packaged. The spinning pack contains a spinneret with 34 or 68 round holes and a sandholder with A sand. This procedure followed 8 times to give items A to H. Two control yarns are spun by the same procedure except that no polyphosphonate is added.

Each of the yarns of Items A to H and the control yarns are 2-plied and the plied yarns knit into fabrics having a weight of about 7 ounces per square yarn (236 grams per square meter). The fabrics are seamed, scoured and conditioned as described and their flame retardancy measured.

Yarn and flame retardancy values are given in Table I.

TABLE I

| Item No. | Polyphosphonate | % P | Yarn Count Den /Fil. | Ten., gpd. | Elong., % | Residual Flame Time, sec. | Fabric Burn Time, sec. | Char Length, cm |
| --- | --- | --- | --- | --- | --- | --- | --- | --- |
| A | PRC/P | 0.90 | 152/34 | 2.7 | 26.5 | 9.3 | — | 5.1 |
| B | PRC/P | 0.56 | 152/34 | 3.1 | 28.3 | 22.6 | 2.8 | 5.3 |
| C | PRC/P | 0.14 | 152/34 | 2.5 | 28.6 | 37.6 | 7.9 | 6.1 |

TABLE I-continued

| Item No. | Polyphosphonate | % P | Yarn Count Den./Fil. | Ten., gpd. | Elong., % | Residual Flame Time, sec. | Fabric Burn Time, sec. | Char Length, cm |
|---|---|---|---|---|---|---|---|---|
| D | PRC/BP | 0.49 | 153/68 | 2.7 | 16.8 | 20.5 | 4.7 | 4.8 |
| E | PRC/PP | 0.63 | 148/34 | 2.5 | 34.7 | 7.9 | 2.6 | 5.3 |
| F | PRC/PP | 0.60 | 154/68 | 4.2 | 33.6 | 19.3 | 5.5 | 5.6 |
| G | PRP/PP | 0.82 | 157/34 | 3.3 | 28.9 | 3.4 | 3.7 | 3.3 |
| H | PRP/PP | 0.43 | 153/34 | 3.1 | 24.6 | 10.0 | 3.0 | 3.6 |
| J[a] | PRC/BP | — | — | — | — | 24.8 | 6.2 | 5.3 |
| Control I | None | — | 151/34 | 3.7 | 22.8 | 51.2 | 15.8 | 17.6 |
| Control II | None | — | 154/68 | 4.1 | 34.9 | 45.1 | 12.9 | 6.4 |

[a]A 1:1 blend of D and Control II.

When an attempt is made to spin polyesters using poly(m-phenylene cyclohexylphosphonate) that is not end-capped with a monofunctional reactant, the pressure in the spinning pack rises continuously and the process becomes inoperable. When the above polyphosphonate is prepared using an excess of the resorcinol reactant to terminate the polymer molecule with this difunctional reactant, the pressure rise in the spinning pack is so rapid that the spinning of filaments is virtually impossible.

EXAMPLE II

Yarns of Items D, E, G, H and Control I are knit into fabrics having a weight of about 100 grams per square meter and the fabrics are treated with carbon tetrachloride to remove surface contaminants. The fabrics are then exposed in the Weater-O-Meter for 80 hours as described above to determine their photoyellowing. Results are shown in Table II.

TABLE II

| Item | Polyphosphonate | % P | "Δb" Values | | | |
|---|---|---|---|---|---|---|
| | | | 20 Hrs. | 40 Hrs. | 60 Hrs. | 80 Hrs. |
| D | PRC/BP | 0.49 | −0.2 | 1.2 | 1.3 | 2.5 |
| E | PRC/PP | 0.63 | 2.4 | 2.6 | 4.0 | 3.7 |
| G | PRP/PP | 0.82 | 5.9 | 6.5 | 8.5 | 8.7 |
| H | PRP/PP | 0.43 | 5.0 | 6.0 | 6.6 | 7.2 |
| Control I | | | −0.0 | −2.0 | −1.6 | −0.5 | −1.7 |

The poly(m-phenylene cyclohexylphosphonate) end-capped with p-phenylphenol causes much less photoyellowing than the poly(m-phenylene phenylphosphonate) end-capped with p-phenylphenol. Photoyellowing is further reduced by end-capping poly(m-phenylene cyclohexylphosphonate) with p-bromophenol.

The process of this invention is advantageously applicable and useful in producing other polyester shaped articles, such as films. The flame retardancy and reduction in photoyellowing imparted to poly(ethylene terephthalate) by this invention provides for producing films, particularly biaxially oriented heat set films, useful for glazing, metallic yarn (made from film on which a metal has been vapor deposited or to which a metal foil has been laminated), drafting films, book jackets, and fabric stiffeners for wearing apparel, such as collar stays.

I claim:

1. In the process of producing polyester textile filaments by pumping molten ethylene terephthalate polymer to a spinning pack and extruding the molten polymer to form filaments, the improvement for preparing flame retardant filaments which comprises melting and mixing with the molten polymer a polyphosphonate compound represented by the formula,

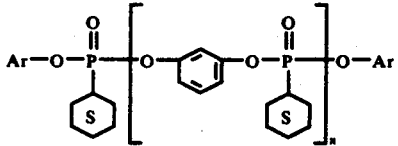

wherein Ar is

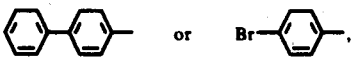

represents cyclohexyl, and n is an integer between 1 and 20, forwarding the resulting melt blend to the spinning pack and extruding the melt blend into filaments, an amount of polyphosphonate compound being added which provides 0.1 to 2 percent phosphorus by weight in the filaments.

2. A process as defined in claim 1 wherein an amount of polyphosphonate compound is added which provides 0.3 to 1.0 percent phosphorus by weight in the filaments.

3. A process as defined in claim 1 wherein Ar is a p-diphenyl group and n is an integer from 5 to 15.

4. Flame retardant polyester articles containing about 1 to 16 percent by weight of a polyphosphonate compound represented by the formula,

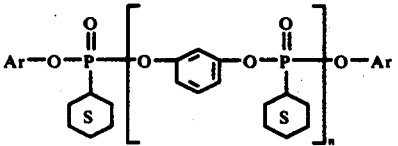

wherein Ar is

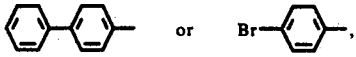

represents cyclohexyl, and n is an integer from 5 to 15.

* * * * *